UNITED STATES PATENT OFFICE.

ARTHUR WEINBERG, OF FRANKFORT-ON-THE-MAIN, PRUSSIA, GERMANY, ASSIGNOR TO LEOPOLD CASSELLA & CO., OF SAME PLACE.

BLUE AZO DYE.

SPECIFICATION forming part of Letters Patent No. 421,640, dated February 18, 1890.

Application filed August 13, 1889. Serial No. 320,652. (No specimens.)

*To all whom it may concern:*

Be it known that I, ARTHUR WEINBERG, doctor of philosophy, a subject of the King of Prussia, and a resident of Frankfort-on-the-Main, have invented certain new and useful Improvements in the Manufacture of Aromatic Bases and Sulpho-Acids and of Coloring-Matters Derived Therefrom, of which the following is a specification.

My invention relates to the production of new blue coloring-matters derived from the oxyethers of alpha-naphthylamine and the sulpho-acids of these bases.

In carrying out my invention I proceed as follows: I first react with diazo or polyazo compounds upon the oxyethers of alpha-naphthylamine or their sulpho-acids. The so-formed azo coloring-matters are treated with nitrous acid and then combined with phenols or amines. The oxyethers of alpha-naphthylamine are obtained by treating naphthol ethers with nitric acid and by then reducing the nitro-naphthol ethers. They have the formula $C_{10}H_6(OR)NH_2$, wherein R represents methyl, ethyl, &c. The sulpho-acids are obtained by nitrifying sulpho-naphthol ethers—such as the ethers of the so-called "Schäffer acid"—and the naphthol-sulpho acid F, which are produced by alkylating the said acids. The nitro products are reduced in the known way.

The amido-sulpho-naphthol ethers have the formula $C_{10}H_5(OR)SO_3H.NH_2$. These bases and sulpho-acids react with diazo compounds in the manner described in the following examples:

*Example I.*—9.3 kilograms of aniline are diazotized in the well-known manner and the diazo compound is added to a solution of twenty-eight kilograms of amido-sulpho-ethyl naphthol containing some acetate of soda. A violet precipitate of the color is formed, which dissolves in alkalies with a dark red shade.

*Example II.*—Thirty kilograms of naphthylamine disulphonic acid are diazotized and slowly added to a solution of twenty-one kilos of methoxy-alpha-naphthylamine chlorhydrate. The dye-stuff will be immediately formed and precipitated.

*Example III.*—18.4 kilos of benzidine are diazotized and brought together with a neutral solution of fifty kilos alpha-amido-sulpho-naphthol ether. After standing for some time a reddish-violet dye-stuff will be formed. If the dye-stuffs obtained in this way are treated with nitrous acid, they are converted into diazo-azo compounds, which again react upon phenols and amines, forming dark-blue to green azo dye-stuffs. I proceed, for instance, as follows:

*Example IV.*—The sodium salt of the dye-stuff described in Example I is dissolved in water, together with an equivalent quantity of nitrite, and the solution is acidulated with hydrochloric acid. After a few hours the reaction is finished and the diazo-azo compounds separate in yellow flakes. The latter is added to an alkaline solution of beta-naphthol-alpha-disulphonic acid. A dark precipitate of the dye-stuff is formed, which is filtered off. It dyes on wool and silk a fast dark blue.

*Example V.*—To a solution of the azo compounds described in Example II, I add an equivalent of nitrite and hydrochloride acid. From the thus-obtained yellow solution of the diazo-azo compound the latter is precipitated by means of common salt. It is introduced into an alkaline solution of naphthol-disulpho acid R. The dye-stuff dyes wool and silk a greenish-blue shade. The analogous combination of the diazo-azo compound with beta-naphthol, $\beta_1 \beta_4$ dioxynaphthaline, and oxydiphenylamine are distinguished by their fastness against washing, and specially by their property of dyeing unmordanted cotton a greenish-blue shade.

*Example VI.*—The dye-stuff of Example III is converted by nitrous acid into a brown precipitate nearly insoluble in water. For this purpose two equivalents of nitrite are necessary. The precipitate dissolves in an alkaline solution of two equivalents of a naphthol-sulphonic acid—for instance, R salt—with a green color. The thus-formed coloring-matter dyes unmordanted cotton a dark-green shade.

What I claim as new, and desire to secure by Letters Patent, is—

The process of preparing blue coloring-matters consisting in first combining diazo compounds with the oxyethers of alpha-naphthylamine or their sulpho-acids, forming as intermediate products the sulpho-acids of compounds of the general formula $R_1-N=NC_{10}H_5(OR)NH_2$, (where $R_1NH_2$ stands for the aromatic amido compound, R for the alkyl group,) and afterward diazotizing these basic compounds and reacting with the diazo-azo derivatives upon amines or phenols, substantially as herein described.

In testimony that I claim the foregoing as my invention I have signed my name, in presence of two witnesses, this 26th day of July, 1889.

ARTHUR WEINBERG.

Witnesses:
ALVESTO S. HOGUE,
JEAN GRUND.